(12) United States Patent
Bhuiya et al.

(10) Patent No.: US 9,940,837 B2
(45) Date of Patent: *Apr. 10, 2018

(54) REFERENCE TOKENS FOR MANAGING DRIVERLESS CARS

(71) Applicant: International Business Machines Corporation, Armonk, NY (US)

(72) Inventors: Subhajit Bhuiya, Bangalore (IN); Ajay Chebbi, Bangalore (IN); Vijay G. Patil, Bangalore (IN); Vaibhav Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,157

(22) Filed: Jul. 7, 2016

(65) Prior Publication Data

US 2016/0379493 A1 Dec. 29, 2016

Related U.S. Application Data

(63) Continuation of application No. 14/750,310, filed on Jun. 25, 2015, now Pat. No. 9,443,427.

(51) Int. Cl.
*G08G 1/00* (2006.01)
*G01C 21/00* (2006.01)
(Continued)

(52) U.S. Cl.
CPC ....... *G08G 1/0968* (2013.01); *G01C 21/3407* (2013.01); *G05B 19/0426* (2013.01); *G05D 1/0276* (2013.01); *G05D 1/0291* (2013.01); *G06Q 10/02* (2013.01); *G06Q 50/30* (2013.01); *G07B 15/063* (2013.01); *G08G 1/09* (2013.01); *G08G 1/20* (2013.01); *G08G 1/207* (2013.01);
(Continued)

(58) Field of Classification Search
CPC .......... G08G 1/00; H04W 4/00; G01C 21/00; G05D 1/00
See application file for complete search history.

(56) References Cited

U.S. PATENT DOCUMENTS 4,104,630 A * 8/1978 Chasek ................ B61L 25/045
342/44
5,083,689 A 1/1992 Vaterlaus
(Continued)

FOREIGN PATENT DOCUMENTS

JP 2009031205 A 2/2009
KR 101241516 B1 3/2013
(Continued)

OTHER PUBLICATIONS

Nezamuddin; "Developing Microscopic Toll Plaza Model Using Paramics"; Thesis; Department of Civil and Environmental Engineering; Summer Term 2006; pp. 1-133; University of Central Florida; Orlando, Florida.
(Continued)

*Primary Examiner* — Yonel Beaulieu
(74) *Attorney, Agent, or Firm* — Stephen R. Yoder

(57) ABSTRACT

Negotiating a multi-vehicle environment using vehicle-to-vehicle network tokens for intra-vehicle communication. Preliminary routing assignments are efficiently improved by available intra-vehicle communication.

20 Claims, 5 Drawing Sheets

(51) Int. Cl.
| | |
|---|---|
| *H04W 4/00* | (2009.01) |
| *G05D 1/00* | (2006.01) |
| *G08G 1/0968* | (2006.01) |
| *G06Q 10/02* | (2012.01) |
| *G06Q 50/30* | (2012.01) |
| *G05D 1/02* | (2006.01) |
| *H04W 4/04* | (2009.01) |
| *G01C 21/34* | (2006.01) |
| *G07B 15/06* | (2011.01) |
| *G05B 19/042* | (2006.01) |
| *G08G 1/09* | (2006.01) |
| *H04L 29/08* | (2006.01) |

(52) U.S. Cl.
CPC ............... G08G 1/22 (2013.01); H04L 67/12 (2013.01); H04W 4/046 (2013.01); *G05B 2219/2637* (2013.01); *G05D 2201/0212* (2013.01); *G05D 2201/0213* (2013.01)

(56) References Cited

U.S. PATENT DOCUMENTS

| | | | | |
|---|---|---|---|---|
| 5,485,520 | A * | 1/1996 | Chaum | G06K 7/0008 235/379 |
| 8,587,454 | B1 * | 11/2013 | Dearworth | G07B 15/063 340/5.1 |
| 2002/0065599 | A1 * | 5/2002 | Hameleers | G08G 1/09 701/117 |
| 2003/0001755 | A1 * | 1/2003 | Tiernay | G07B 15/063 340/928 |
| 2011/0013022 | A1 * | 1/2011 | Allen | G07B 15/063 348/149 |
| 2011/0136468 | A1 * | 6/2011 | McNamara | G06Q 20/14 455/406 |
| 2014/0278029 | A1 | 9/2014 | Tonguz et al. | |
| 2014/0278052 | A1 * | 9/2014 | Slavin | G01C 21/3492 701/400 |
| 2014/0309814 | A1 | 10/2014 | Ricci et al. | |

FOREIGN PATENT DOCUMENTS

| | | |
|---|---|---|
| KR | 1020140045212 A | 4/2014 |
| WO | 2016190840 A1 | 12/2016 |

OTHER PUBLICATIONS

"The connected car"; The Economist; Jun. 4, 2009; pp. 1-4; <http://www.economist.com/node/13725743>.

"Vehicular ad hoc network"; Wikipedia, the free encyclopedia; last modified on Mar. 8, 2015; pp. 1-3; <http://en.wikipedia.org/wiki/Vehicular_ad_hoc_network>.

U.S. Appl. No. 14/750,310 entitled "Reference Tokens for Managing Driverless Cars", filed Jun. 25, 2015.

U.S. Appl. No. 15/208,645 entitled "Reference Tokens for Managing Driverless Cars", filed Jul. 13, 2016.

Appendix P.: List of IBM Patents or Patent Applications Treated as Related, 2 pages.

* cited by examiner

REFERENCE TOKENS FOR MANAGING DRIVERLESS CARS

BACKGROUND OF THE INVENTION

The present invention relates generally to the field of traffic management, and more particularly to managing a driverless vehicle using reference tokens for a vehicle-to-vehicle network.

As a vehicle reaches a toll plaza, according to the state of the art, a user driving the vehicle must visually review the various toll gates to guess which toll gate best suits the user's needs, whether the user is paying electronically or by cash or whether the user wishes to find a shortest line or locate an otherwise more convenient line, such as one on a preferred side of the road.

A driverless car (vehicle), also known as an autonomous car, self-driving car, and robotic car, is an automated or autonomous vehicle capable of fulfilling the main transportation capabilities of a traditional car. As an autonomous vehicle, it is capable of sensing its environment and navigating without human input. Driverless vehicles sense their surroundings with techniques including radar, lidar, GPS (global positioning system), and computer vision. Advanced control systems interpret sensory information to identify appropriate navigation paths, as well as obstacles and relevant signage.

SUMMARY

According to an aspect of the present invention, there is a method, computer program product and/or system for managing traffic in a multi-vehicle environment using a vehicle-to-vehicle network that performs the following steps (not necessarily in the following order): (i) identifying a first vehicle entering the multi-vehicle environment, (ii) determining a first dataset corresponding to the first vehicle, and (iii) assigning a first token to the first vehicle based, at least in part, on the first dataset. The first token grants access to a first assigned destination for the first vehicle.

According to an aspect of the present invention, there is a method, computer program product and/or system for using a token as reference in communications for driverless vehicles in a toll gate system that performs the following steps (not necessarily in the following order): (i) identifying an first entering vehicle and a second entering vehicle, (ii) determining a first vehicle dataset corresponding to the first entering vehicle, (iii) determining a second vehicle dataset corresponding to the second entering vehicle, (iv) assigning a first toll gate token to the first entering vehicle, (v) assigning a second toll gate token to the second entering vehicle, (vi) notifying the first and second entering vehicles of the first and second toll gate tokens. The first and second vehicle datasets include driver information, vehicle information, and historic use information. The first and second toll gate tokens are unique identifiers that respectively correspond to assigned toll gates and times of entry of the first and second entering vehicles. The first toll gate token provides the first vehicle with access to a vehicle-to-vehicle network established by the toll gate system. The first vehicle communicating over the vehicle-to-vehicle network with the second vehicle. At least the determining and assigning steps are performed by computer software running on computer hardware.

DETAILED DESCRIPTION

Figure 1:
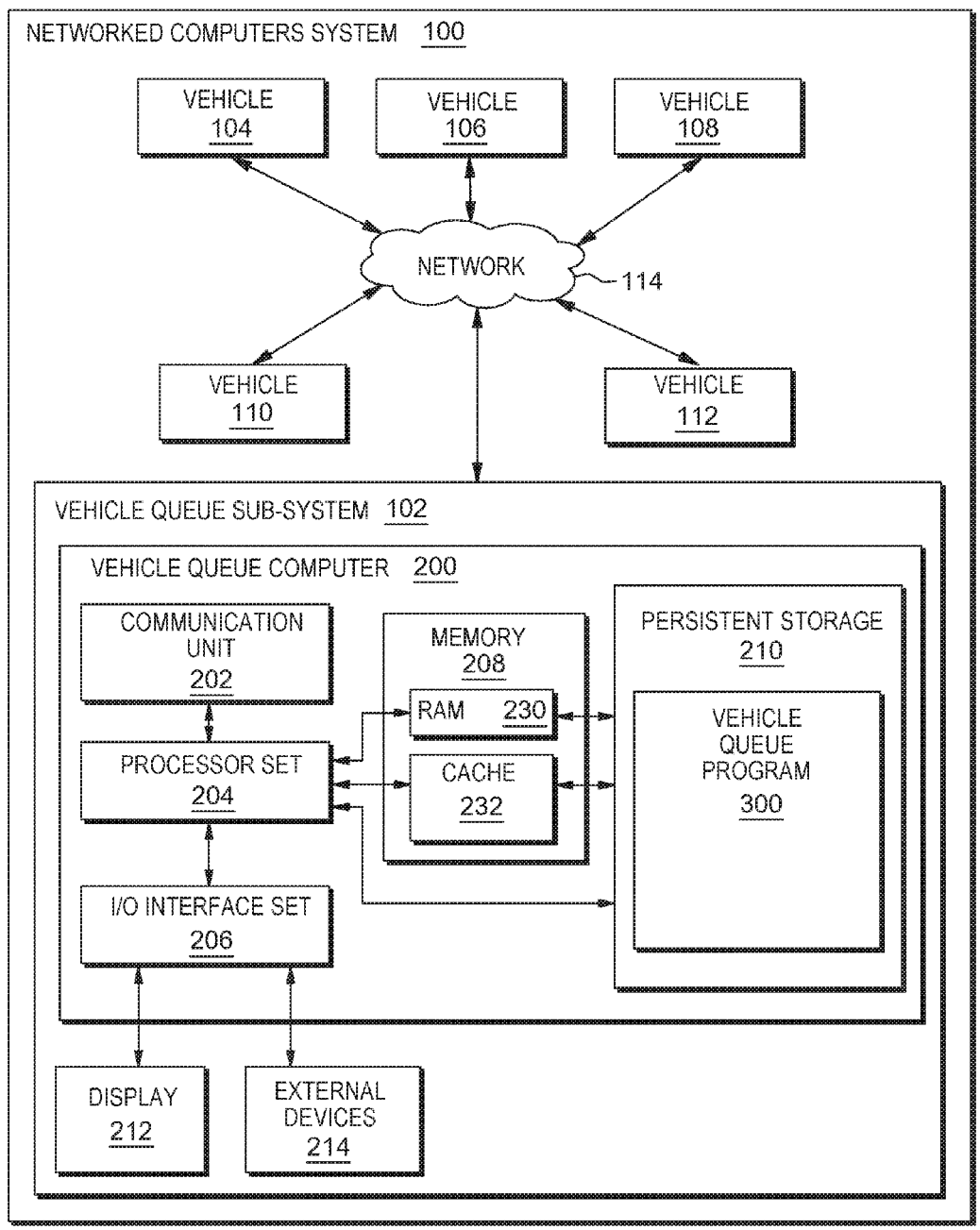
FIG. 1 is a block diagram view of a first embodiment of a system according to the present invention.

Negotiating a multi-vehicle environment using vehicle-to-vehicle network tokens for intra-vehicle communication. Preliminary routing assignments are efficiently improved by available intra-vehicle communication. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: vehicle queue sub-system 102; vehicle sub-systems 104, 106, 108, 110, 112; communication network 114; vehicle queue computer 200; communication unit 202; processor set 204; input/output (I/O) interface set 206; memory device 208; persistent storage device 210; display device 212; external device set 214; random access memory (RAM) devices 230; cache memory device 232; and vehicle queue program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 2:
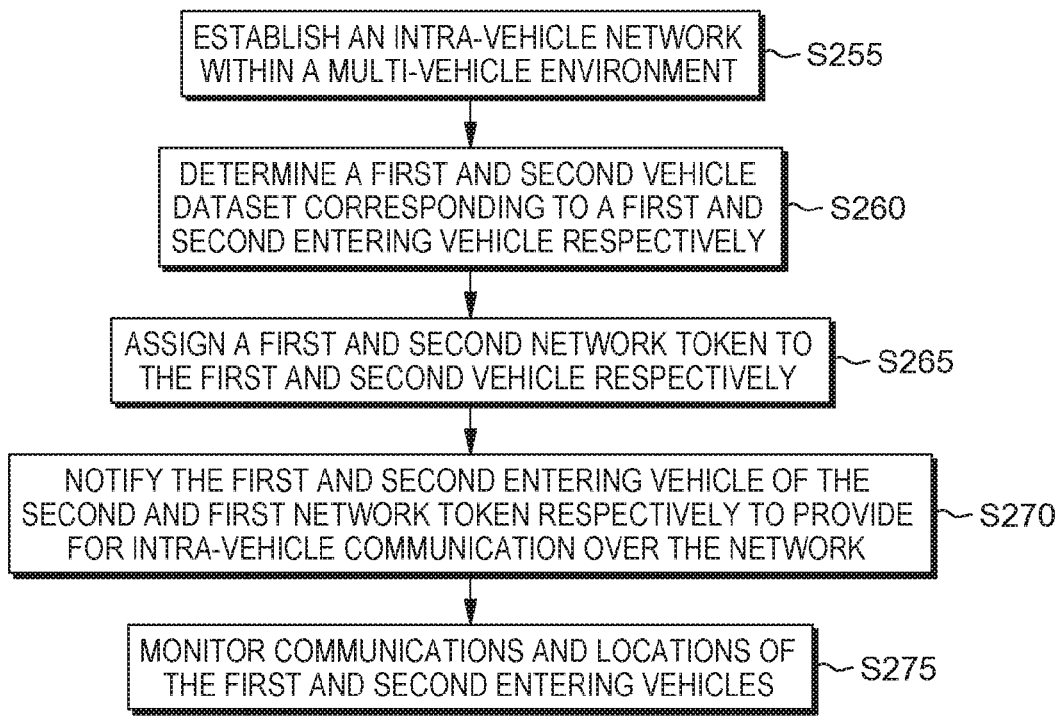
FIG. 2 is a flowchart showing a first embodiment method performed, at least in part, by the first embodiment system.
Figure 3:
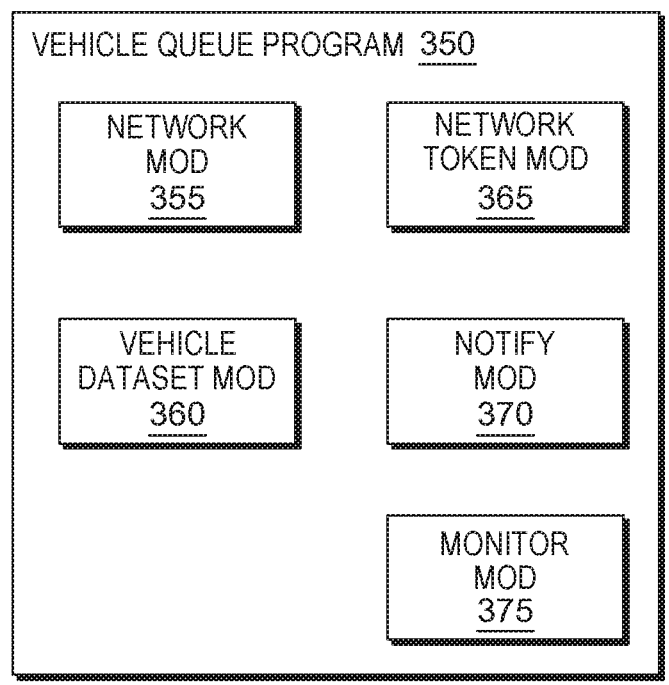
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). The example referred to throughout the paragraphs that follow is where two vehicles, a passenger van and a delivery truck, enter a parking lot of a shopping mall. These vehicles are each operated according to a driverless vehicle system.

Processing begins at step S255, where network module ("mod") 355 establishes an intra-vehicle network, such as network 114 (FIG. 1), within a multi-vehicle environment. In this example, the multi-vehicle environment is parking lot. In the section III, below, the multi-vehicle environment is a toll plaza on a toll road. Alternatively, the multi-vehicle environment is a stretch of road in which driving lanes are managed. The intra-vehicle network is established according to ways now known, or to be known in the future. One characteristic of this intra-vehicle network is that tokens are provided to network participants in order to establish communication among vehicles.

Processing proceeds to step S260, where vehicle dataset mod 360 determines a first and a second vehicle dataset corresponding to a first and second entering vehicle respectively. As a vehicle enters the multi-vehicle environment, the vehicle dataset module identifies a pre-determined set of information. The specific information to be identified or determined is based on the particular environment in which the vehicle is entering, whether in a parking lot or merging onto a roadway. In this example, each vehicle dataset contains information, to the extent available, including: (i) vehicle size (to determine, for example, parking space requirements); (ii) number of passengers (including the driver, if any); (iii) previously used parking space(s); (iv) type of cargo; (v) special needs and/or preferences of one or more passengers (based on, for example, a handicap posting or historic special needs or preferences); and (vi) type of vehicle (for example, emergency response vehicle, ambulance, and/or fire brigade). Alternatively, and as described in more detail below, each vehicle dataset includes: (i) driver information; (ii) vehicle information; and historic use information.

According to some embodiments of the present invention, driver information includes information specific to the driver and/or passengers of the vehicle. This information relates to the needs and/or preferences of the driver, whether explicitly stated or inferred by context and/or historic use.

According to some embodiments of the present invention, vehicle information includes information about the vehicle and its cargo, if any. Information such as cargo weight may be determined by scales strategically located about the parking lot zone. In some embodiments, registered delivery vehicles receive tailored assistance in for parking such that cargo is unloaded quickly or efficiently. Vehicle information may also include: (i) vehicle make and model; (ii) license plate information; (iii) vehicle dimensions (size, shape, number of wheels); and/or (iv) trailer information, if any.

According to some embodiments of the present invention, historic use information includes information collected during previous encounters with the same vehicle. A same vehicle is determined in various ways including: (i) pre-existing token data; (ii) license plate information; (iii) vehicle identification number (VIN); (iv) passenger and/or driver recognition; and/or (v) pre-registration information.

Processing proceeds to step S265, where network token mod 365 assigns a first and second network token to the first and second entering vehicle respectively. Each network token is a unique vehicle-specific identifier that includes destination information, such as parking space identifier, loading dock identifier, and toll gate number. In this example, the passenger van enters the parking lot first and obtains, or otherwise receives, a network token directing it to a convenient parking space near the entrance to a popular store that the passenger van indicated a preference for during a pre-registration process. The delivery truck arrives next, but the loading dock for the same popular store is occupied by an earlier arriving truck. Accordingly, the delivery truck receives a network token directing it to a parking space toward the back of the parking lot near a large opening of unoccupied parking spaces, where it can wait for the loading dock to clear.

Processing proceeds to step S270, where notify mod 370 notifies the first and second entering vehicle of the second and first network tokens respectively to provide for intra-vehicle communication over the network. Intra-vehicle communication allows for each vehicle to work out exchanges of assigned locations, such as toll gates, or to otherwise work out waiting line positions, etc. In this example, the passenger van requires additional space along its side to allow the passengers to comfortably exit. Accordingly, the passenger van communicates with other parking vehicles, including the delivery truck. The delivery truck is able to use the nearby parking space of the passenger van, so it trades the assigned outer parking space for the convenient space assigned to the passenger van. By communicating between vehicles after receipt of the initial network token a potential parking dilemma is resolved by effectively reassigning a token received by one vehicle to another vehicle. The reassignment is performed, in one embodiment, by the vehicles trading tokens. Alternatively, the server computer reassigns tokens based on agreed upon actions between two vehicles. Alternatively, a priority vehicle, such as an ambulance, receives a priority token so that non-priority vehicles are required to exchange their token with the priority vehicle on-demand.

Processing ends at step S275, where monitor mod 375 monitors communications and locations of the first and second entering vehicles. In some embodiments, the monitor mod records the final location of the vehicle where the multi-vehicle environment is a parking lot. By monitoring communications, the monitor mod is able to develop historical records of each vehicle for potential future use by vehicle dataset module 360. In some embodiments of the present invention, the monitor mod provides information to network token mod 365 for machine learning purposes. In this example, the monitor mod records the final parking space occupied by passenger van and the final unloading location of the delivery truck. Additionally, the monitor mod provides alternative parking space data for the delivery van to vehicle dataset module 360. In that way, a token for the convenient parking space may be provided to the delivery truck when the loading dock is occupied, or even when a pre-registered delivery vehicle is soon to arrive.

III. FURTHER COMMENTS AND/OR EMBODIMENTS

At a toll plaza, an incoming vehicle communicates with the toll gate via trans-receivers seeking the best-suited toll gate recommendation. The toll gate system, according to various factors related to the incoming vehicle, the historical data about the toll payment, and the vehicle clearance rate at a given toll gate communicates with the incoming vehicle to recommend the best-suited toll gate. During this time, the driver of the vehicle needs not perform any explicit action because the communication occurs automatically over a vehicle-to-vehicle network. The incoming vehicle, once assigned a lane and a corresponding token can further communicate with other connected vehicles to negotiate a change in the assigned toll gate with other vehicles. The algorithm described herein allows the vehicle to perform a token exchange in order to move to a different, preferred, toll gate.

Some embodiments of the present invention recognize the following facts, potential problems and/or potential areas for improvement with respect to the current state of the art: (i) there are limited number of mechanisms available for identifying which toll gate is best suited for an incoming vehicle; and (ii) it is likely that a visually preferred lane, such as one that appears to be the shortest lane, is not the fastest moving lane due to various factors.

Figure 4:
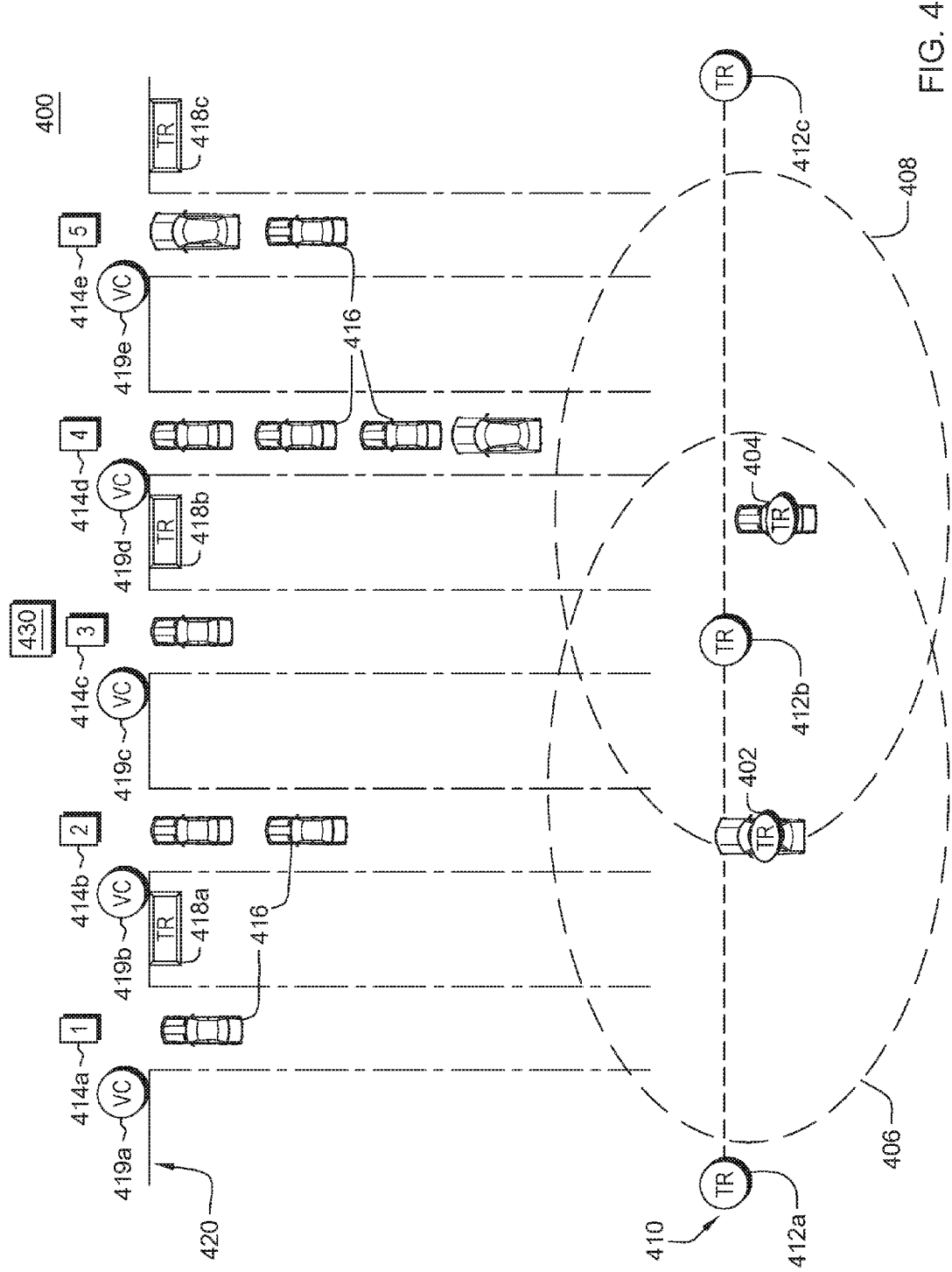
FIG. 4 is a diagram view showing information that is generated by and/or helpful in understanding embodiments of the present invention.

FIG. 4 illustrates toll system 400 operating according to an embodiment of the present invention. Toll system 400 includes: entering vehicles 402, 404; vehicle negotiation ranges 406, 408; entry point 410; entry point transceivers 412a, 412b, 412c; toll gates 414a, 414b, 414c, 414d, 414e; queued vehicles 416; toll point transceivers 418a, 418b, 418c; cameras 419a, 419b, 419c, 419d, 419e; toll point 420; and toll computer 430.

Parameters to be accounted for in assigning a toll gate include: (i) toll point clearance speed, by toll operator (e.g. how fast has this operator been historically, how much cash does the toll operator have in hand, and/or jammed vehicles in the corresponding toll lane); (ii) number of vehicles in the lane (e.g. how many cars (or drivers) at present in lane request cash transactions and how many request credit card transactions); (iii) length of the vehicles (backed up cars); (iv) approach lane of entering vehicle, such as vehicles 402 and 404; (v) historical mode of payment of the entering car; (vi) lane adjustment needed; and/or (vii) type to lane mapping (e.g. reserved lanes for RFID service, heavy trucks, reserved vehicles).

An example interaction model follows. At the entry point TR 412b, for example, transmits signals to incoming vehicles 402 and 404. For example, incoming vehicle 402 receives the signal and communicates back to TR 412b to register a license number (and/or unique ID) to the TR at entry point. The TR gets the license plate number and/or other information for delivery to central Toll server 430 for providing identification. Along with this, the status server of vehicle 402 is contacted to get vehicle conditions to predict potential jamming of the vehicle in the toll lane. Along with this, the nearest entry toll lane of the vehicle is determined by the toll server based on the lane from which the vehicle enters. The toll server registers incoming vehicle 402 with a UUID (universally unique identifier). The toll server allocates a −T to +T to the toll gates that may be best suited for the vehicle's eventual toll gate. This action is taken to avoid additional movement of the vehicle while reaching a toll lane. The lane number X and token number Y are assigned to the vehicle in the −T to +T range (discussed in more detail below). Toll point TR sends a beamer on messaging protocol (like MQTT) to vehicle 402, which is assigned lane X and token number Y. The on-board navigation system of vehicle 402 directs the vehicle to enter toll lane X with token Y. Subsequently, vehicle 402 may negotiate a lane adjustment with vehicle 404, or other vehicles located within vehicle negotiation range 408 of toll system 400. Accordingly, vehicle 402 and vehicle 404 exchange the lane assignment and corresponding token to adjust their respective assignments. Additionally, one or more of these vehicles may inform toll system 400 of the token exchange. The negotiation range is a predefined communication range to limit communication to vehicles that are sufficiently proximate to communicating vehicle. The determination of what distance is sufficiently proximate depends largely on the environment and is determined by a system architect, system administrator, or other authorized person.

An example process for assigning a toll gate number and token considers: (i) toll booth clearance speed includes (how fast has this operator been historically) (how much cash the operator has in hand); (ii) jammed cars in lane (using information from central server); (iii) number of vehicles in the lane (how many cars (or drivers) at present in lane do cash transactions vs credit card based on a driver profile from the central server); (iv) the length of the vehicles (backed up cars) (although lanes are filled up with long vehicle, but there is more chances of reaching booth faster).

Historical data captured from a central queue server includes: (i) previous lane(s) of the incoming vehicle; (ii) historical mode of payment of the incoming vehicle; and/or (iii) the type to lane mapping (reserved lanes) (RFID, heavy trucks, reserved vehicles).

Some embodiments of the present invention define a minimum set of lanes in which a vehicle can enter according to the lane of the vehicle at the entry point. For example, a car entering from lane 4 and allocated lane 15 will require a lot of movement. So, to avoid this, the car entering from lane 4 is allocated one of lanes 2, 3, 4, 5, 6, which is −T to +T, where T is 2.

Some embodiments of the present invention include a toll plaza central system that tracks the mode of payment for entering vehicles. Such a system may store the license plate number, potential driver information, and the corresponding entry of last interactions at associated toll gates. Based on the recent history, some embodiments of the present invention determine the likely type of payment to be made, such as credit card or currency. This helps in allocating fast moving lanes. Some embodiments of the present invention apply machine learning to adjust assumptions based on the ongoing driver/vehicle profiling activities.

Some embodiments of the present invention are directed to toll lanes that allow assigned, or pre-registered, vehicles to use reserved lanes. When the vehicle type is identified using, for example, license plate recognition, an assigned vehicle is confirmed to move to reserved lanes. A similar algorithm applies for routing the pre-registered vehicle to the reserved lane(s). If the reserved lane is lane 1, then all pre-registered vehicles are suggested, via a token, to move to lane 1. Each driver or autonomous vehicle, may opt out of the reserved lane assignment in order to negotiate with any other vehicles for an alternative lane change or toll gate assignment.

TABLE 1

Calculating the time to be taken on toll gate (C = Cash; CC = Credit Card)

| PARAMETER | GATE 1 | GATE 2 | GATE 3 |
|---|---|---|---|
| OPERATOR SPEED | 5 | 7 | 6 |
| CASH IN HAND (TOLL OPERATOR) | 200 | 350 | 30 |
| TOLL FEE | 50 | 50 | 50 |
| JAMMED VEHICLES | 0 | 0 | 1 |
| VEHICLE COUNT | 2 | 5 | 3 |
| PAYMENT MODE BY VEHICLE | C, C | C, C, C, C, C | CC, CC, CC |

A cost number for each vehicle is determined based on the factors listed in Table 1, above. In one example, the vehicles associated with cash payments are assigned a lane having high operator speed so long as the operator has enough cash in hand and the vehicles associated with credit card payment are routed through another lane, for example where the operator has less cash in hand. As shown in Table 1, the operator of Gate 3 has less cash in hand than the other operators. In fact, if a vehicle off 100 units of cash to the operator of Gate 3, she would not be able to provide the necessary 50 units of cash in return. Ideally, the slower lane vehicles will be fewer than the faster lane vehicles. The per gate output is a number, CGx.

Some embodiments of the present invention are aware of which toll gate is in line with each incoming vehicle from the point where vehicle is entering at the entry point. This supports recognition of the overall distance for which the car would have to travel if a different toll gate is assigned. The target distance for each vehicle to travel is the lowest distance from the entry point to a toll gate. Essentially, this considers the probability of quick movement of a car from the toll entry to the toll exit.

Calculating the time to be taken at the toll gate takes into account one or more of the following: (i) the speed at which the operator typically works (for example, the number of cars served every 10 minutes); (ii) how much cash the operator has on the counter, or "in hand," for cash transactions; (iii) lane-specific information, such as road condition and width; and/or (iv) how much time it takes for the vehicle to exit the toll gate lane where the car allocated to a different toll gate.

Historical data available in the vehicle and/or driver profile include: (i) one of three vehicle categories—good, fair, and poor (vehicle category is based on engine condition and service history); (ii) historical mode of payment (no payment or pre-payment, credit card, and currency); (iii) define a preference for payment and condition of vehicle (e.g. good condition—no payment; bad condition—no payment; good condition—payment via credit card; fair condition—no payment; poor condition—payment via credit card; good condition—payment via cash; fair condition—payment via credit card; poor condition—payment via cash; and/or fair condition payment via cash). For example, if the vehicle is in good condition and prepayment is made, the vehicle will move faster through the toll lanes than a car in bad condition and making the payment with cash. Alternatively, payment method is the only criteria. Alternatively, vehicle condition is the only criteria.

Figure 5:
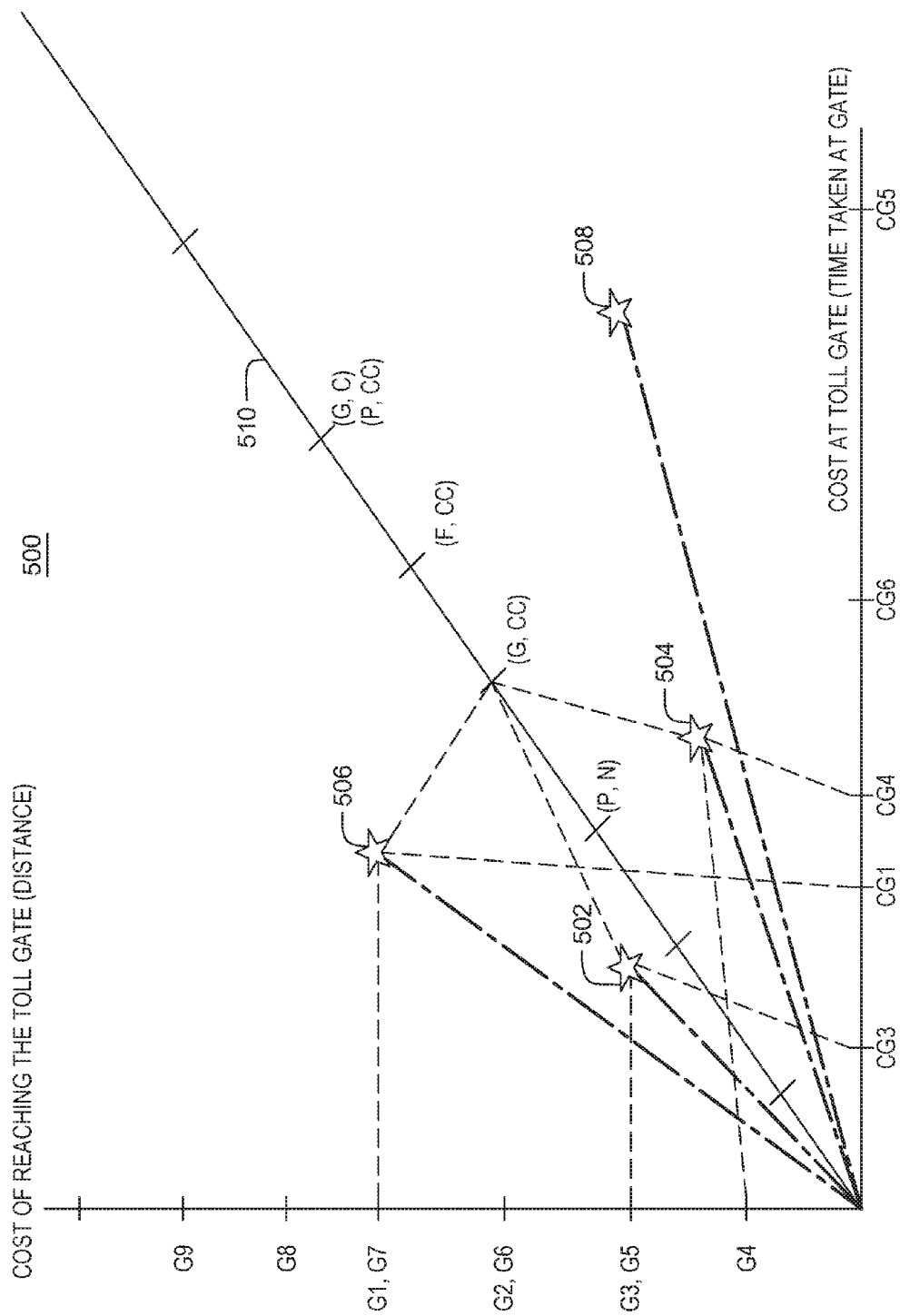
FIG. 5 is a graph view showing information that is generated by and/or helpful in understanding embodiments of the present invention.

FIG. 5 is chart 500 depicting exemplary costs for vehicles entering the lane for Toll Gate 4 based on distance to the various gates and duration of stop at the gate. Chart 500 includes: first estimated cost 502; second estimated cost 504; third estimated cost 506; fourth estimated cost 508; and normalized factors line 510. The normalized factors line includes points associated with various condition-payment pairs, where the terms G, F, and P represent vehicle conditions good, fair, and poor respectively. Also the terms N, C, and CC represent payments types, none, cash, and credit card respectively. Alternatively, or additionally, normalized factors include operator speed for determining whether or not a particular vehicle condition and payment method will jam a particular toll gate. The x-axis represents the estimated cost at a given gate, where the estimated cost at gate 3 is denoted as CG3, the estimated cost at gate 1 is denoted as CG1, and so forth. The y-axis represents the distance from origin to various toll gates, where gate 1 is denoted as G1, gate 2 is denoted as G2, and so forth.

According to FIG. 5, when a vehicle enters the toll gate plaza, an embodiment of the present invention calculates a preferred toll gate for the entering vehicle. In this example, toll gates +/−3 from the entering gate (gate 4) are considered. Accordingly, the vehicle may be routed to any of toll gates 1 through 7 (G1 to G7), shown on the y-axis. Based on information, as shown by example in Table 1, the potential time taken at each gate is determined. Shown as cost of gate (CG) along the x-axis. Estimated costs, shown as stars on the graph, identify the preferred gate. The star that is the shortest distance from the origin of the graph in the preferred gate. In this example, estimated cost 502, is closest to the origin and it indicates that one of gates 3 or 5 (equidistant from gate 4) is a desirable gate. Here, the CG3 is much better than CG5, which has the highest "cost," or time taken at gate. Therefore, gate 3 is selected and a token for gate 3 is provided to the entering vehicle. As shown in this example, even though the vehicle entered from in front of Gate 4 towards the toll plaza, based on the parameters considered, the vehicle is allocated to Gate 3, balancing out the distance the vehicle needs to travel, the toll operator speed at the gates, and the mode of payment from the vehicle.

Alternatively, the same graph is used by toll plaza management while allocating gates/tokens to two or more vehicles that enter the toll gate at the same time. In that case, the vehicle condition is likely different and will play a role in allocation along with gate distance and operator speed.

Alternatively, while negotiating for tokens, a graph, such as the one shown in FIG. 5, is used to understand (by a vehicle or by the toll plaza, if the vehicle seeks advice) on the additional cost, if any, arising from negotiating their assigned token with another vehicle. This alternative use serves the vehicle(s), in real time, by capturing the location of the vehicle (Y-axis) and the cost of toll (X-axis), assuming on-hand cash is available and the vehicle conditions remain constant.

Vehicles "talk" to each other over a vehicle-to-vehicle network to adjust toll gate lanes. For example, Car A is assigned the lane 1 token, 138, however Car A entered from lane 4. Truck B is assigned the lane 3 token, 357, and entered from lane 1. Truck B communicates a request to take lane 1 or 2 based on its proximity to the corresponding gates and states that Truck B has the lane 3 token. Car A responds to Truck B that it is able to negotiate the token exchange. Car A and Truck B exchange toll lane tokens. Car A and Truck B transmit a change of token adjustment to the toll booth for tracking. Car A takes lane 3 (having lane 3 token 357), and Truck B takes lane 1 (having lane 1 token 138). The toll booth records the lane information and proceeds with assigning tokens to entering vehicles based on the current state of traffic.

Some embodiments of the present invention may include one, or more, of the following features, characteristics and/or advantages: (i) identifies factors effecting vehicle and/or driver preference to assigned a preferred traffic route, such as best toll gate, best driving lane, or best parking space.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Multi-vehicle environment: any physical location where a vehicle may compete with another vehicle for a same preferred route. For example where two or more vehicles may be directed into queues, such as in a toll plaza having multiple toll gates, or a highway having one or more carpool lanes. For another example, where a vehicle is directed to an available parking space in a parking lot.

What is claimed is:

1. A method comprising:
    assigning a first network token to a first vehicle entering a multi-vehicle environment including a first destination and a second destination, the first network token granting access to the first destination;
    assigning a second network token to a second vehicle entering the multi-vehicle environment, the second network token granting access to the second destination; and establishing a vehicle-to-vehicle network for communication between the first vehicle and the second vehicle using the first network token and the second network token respectively.

2. The method of claim 1, further comprising:
reassigning the second network token to the first vehicle and the first network token to the second vehicle based at least in part on a communication over the vehicle-to-vehicle network between the first vehicle and the second vehicle;
wherein:
the first vehicle obtains access to the second destination; and
the second vehicle obtains access to the first destination.

3. The method of claim 1, further comprising:
determining a first dataset corresponding to the first vehicle; and
determining a second dataset corresponding to the second vehicle;
wherein the first and second datasets include driver information.

4. The method of claim 1, further comprising:
determining a first dataset corresponding to the first vehicle; and
determining a second dataset corresponding to the second vehicle;
wherein the first and second datasets include vehicle information.

5. The method of claim 1, further comprising:
tracking movement of the first vehicle and the second vehicle.

6. The method of claim 1, wherein the first destination is a toll plaza lane corresponding to a toll gate.

7. The method of claim 1, wherein the first destination is a parking space in a parking lot.

8. A computer program product comprising a computer readable storage medium having stored thereon:
first program instructions programmed to assign a first network token to a first vehicle entering a multi-vehicle environment including a first destination and a second destination, the first network token granting access to the first destination;
second program instructions programmed to assign a second network token to a second vehicle entering the multi-vehicle environment, the second network token granting access to the second destination; and
third program instructions programmed to establish a vehicle-to-vehicle network for communication between the first vehicle and the second vehicle using the first network token and the second network token respectively.

9. The computer program product of claim 8, further comprising:
fourth program instructions programmed to reassign the second network token to the first vehicle and the first network token to the second vehicle based at least in part on a communication over the vehicle-to-vehicle network between the first vehicle and the second vehicle;
wherein:
the first vehicle obtains access to the second destination; and
the second vehicle obtains access to the first destination.

10. The computer program product of claim 8, further comprising:
fourth program instructions programmed to determine a first dataset corresponding to the first vehicle; and
fifth program instructions programmed to determine a second dataset corresponding to the second vehicle;
wherein the first and second datasets include driver information.

11. The computer program product of claim 8, further comprising:
fourth program instructions programmed to determine a first dataset corresponding to the first vehicle; and
fifth program instructions programmed to determine a second dataset corresponding to the second vehicle;
wherein the first and second datasets include vehicle information.

12. The computer program product of claim 8, further comprising:
fourth program instructions programmed to track movement of the first vehicle and the second vehicle.

13. The computer program product of claim 8, wherein the first destination is a toll plaza lane corresponding to a toll gate.

14. The computer program product of claim 8, wherein the first destination is a parking space in a parking lot.

15. A computer system comprising:
a processor set; and
a computer readable storage medium;
wherein:
the processor set is structured, located, connected and/or programmed to run program instructions stored on the computer readable storage medium; and
the program instructions include:
first program instructions programmed to assign a first network token to a first vehicle entering a multi-vehicle environment including a first destination and a second destination, the first network token granting access to the first destination;
second program instructions programmed to assign a second network token to a second vehicle entering the multi-vehicle environment, the second network token granting access to the second destination; and
third program instructions programmed to establish a vehicle-to-vehicle network for communication between the first vehicle and the second vehicle using the first network token and the second network token respectively.

16. The computer system of claim 15, further comprising:
fourth program instructions programmed to reassign the second network token to the first vehicle and the first network token to the second vehicle based at least in part on a communication over the vehicle-to-vehicle network between the first vehicle and the second vehicle;
wherein:
the first vehicle obtains access to the second destination; and
the second vehicle obtains access to the first destination.

17. The computer system of claim 15, further comprising:
fourth program instructions programmed to determine a first dataset corresponding to the first vehicle; and
fifth program instructions programmed to determine a second dataset corresponding to the second vehicle;
wherein the first and second datasets include driver information.

18. The computer system of claim 15, further comprising:
fourth program instructions programmed to determine a first dataset corresponding to the first vehicle; and
fifth program instructions programmed to determine a second dataset corresponding to the second vehicle;

wherein the first and second datasets include vehicle information.

19. The computer system of claim 15, further comprising: fourth program instructions programmed to track movement of the first vehicle and the second vehicle.

20. The computer system of claim 15, wherein the first destination is a toll plaza lane corresponding to a toll gate.

* * * * *